(12) United States Patent
Luo

(10) Patent No.: US 9,026,621 B2
(45) Date of Patent: May 5, 2015

(54) PEER-TO-PEER SCENIC SPOT INFORMATION SHARING NAVIGATING DEVICE AND METHOD THEREOF

(71) Applicants: Mitac International Corp., Taoyuan County (TW); Mitac Computer (Shun De) Ltd., Foshan (CN)

(72) Inventor: Xi-Ping Luo, Kunshan (CN)

(73) Assignees: Mitac International Corp., Kuei San Township, Taoyuan County (TW); Mitac Computer (Shun De) Ltd., Foshan, Guangdong Province (CN)

( * ) Notice: Subject to any disclaimer, the term of this patent is extended or adjusted under 35 U.S.C. 154(b) by 247 days.

(21) Appl. No.: 13/753,002

(22) Filed: Jan. 29, 2013

(65) Prior Publication Data

US 2013/0254344 A1    Sep. 26, 2013

(30) Foreign Application Priority Data

Mar. 22, 2012   (CN) .......................... 2012 1 0078718

(51) Int. Cl.
*H04L 29/08* (2006.01)
*G01C 21/32* (2006.01)
*G01C 21/36* (2006.01)
*G06Q 30/02* (2012.01)

(52) U.S. Cl.
CPC ........ *H04L 29/08306* (2013.01); *H04L 67/104* (2013.01); *H04L 67/18* (2013.01); *G01C 21/32* (2013.01); *G01C 21/3682* (2013.01); *G06Q 30/0241* (2013.01)

(58) Field of Classification Search
CPC ......... H04W 4/02; H04W 4/18; H04W 4/008; H04W 4/12; H04W 64/00; G06F 17/30241; G06F 17/3087; H04L 67/18; H04L 12/189; H04L 12/5895
USPC .................. 709/219, 203, 204, 205, 217–218
See application file for complete search history.

(56) References Cited

U.S. PATENT DOCUMENTS

| | | | |
|---|---|---|---|
| 7,818,122 B2 * | 10/2010 | Tobiyama et al. ............ | 701/426 |
| 8,010,285 B1 * | 8/2011 | Denise .......................... | 701/417 |
| 8,301,323 B2 * | 10/2012 | Niwa .............................. | 701/22 |
| 2003/0216860 A1 * | 11/2003 | Shitamatsu et al. .......... | 701/211 |
| 2012/0315924 A1 * | 12/2012 | Park et al. ................... | 455/456.3 |
| 2013/0124085 A1 * | 5/2013 | Mochizuki et al. ........... | 701/466 |

* cited by examiner

*Primary Examiner* — Ruolei Zong
(74) *Attorney, Agent, or Firm* — Muncy, Geissler, Olds & Lowe, P.C.

(57) ABSTRACT

The present invention discloses a peer-to-peer scenic information sharing navigating device and its method, including a positioning unit for receiving a positioning message to determine position information of a point of interest; an information capturing unit for obtaining scenic spot information of the point of interest; a control unit for receiving the scenic spot information and its corresponding position information, and generating a scenic spot release index based on an identity identification message; a storage unit for storing the scenic spot information according to the control unit; and a communication unit for transmitting the scenic spot release index to a server. If another navigating device accesses the scenic spot release index through the server and requests to download, the control unit will retrieve the scenic spot information from the storage unit, and the communication unit will transmit a part of the scenic spot information to the other navigating device.

12 Claims, 7 Drawing Sheets

PEER-TO-PEER SCENIC SPOT INFORMATION SHARING NAVIGATING DEVICE AND METHOD THEREOF

CROSS-REFERENCE TO RELATED APPLICATION

This application claims the benefit of China Patent Application No. 201210078718.3, filed on Mar. 22, 2012, in the State Intellectual Property Office of the People's Republic of China, the disclosure of which is incorporated herein in its entirety by reference.

BACKGROUND OF THE INVENTION

1. Field of the Invention

The present invention relates to a navigating device, and more particularly to a peer-to-peer information transmitting navigating device and a method thereof.

2. Description of Related Art

In general, conventional navigating devices are mainly provided for receiving signals of a global positioning system (GPS), and computing a user's current position according to the received signal. The GPS signal includes information such as latitude, longitude and altitude, and the navigating device can compute the latitude, longitude and altitude of the user's current position according to three or more of the received GPS signals for 3D positioning. The navigating device can assist users to plan a route according to the received positioning signals within a time period together with map information.

It is noteworthy to point out that the map information of the navigating device must be provided and updated by business operators for the users' download. However, the business operators cannot provide timely information such as store discounts, activities, and change of streets or monitoring of roads. On the other hand, most scenic spot information obtained through the Internet is advertising information or unclassified information, and the validity of some of the searched scenic spot information may be even expired.

As science and technology advance, the navigating devices generally used for planning a route are developed and integrated with the Internet. Therefore, the navigating device with a peer-to-peer information transmitting function can provide a more diversified and convenient service to users. Obviously, designing a peer-to-peer information transmitting navigating device and a method thereof is a subject that demands immediate attentions and feasible solution.

SUMMARY OF THE INVENTION

In view of the aforementioned problems of the prior art, it is a primary objective of the invention to provide a peer-to-peer scenic information sharing navigating device and a method thereof, so as to provide users with instant access to the most updated scenic spot information.

To achieve the foregoing objective, the present invention provides a peer-to-peer scenic information sharing navigating device comprising a positioning unit, an information capturing unit, a control unit, a storage unit and a communication unit. The positioning unit receives a positioning message to determine position information of a point of interest. The information capturing unit obtains scenic spot information of a point of interest. The control unit is coupled to the information capturing unit and the positioning unit for receiving the scenic spot information and the corresponding position information, and generating a scenic spot release index based on an identity identification message that represents the navigating device. The storage unit is coupled to the control unit for storing the scenic spot information according to the control of the control unit. The communication unit is coupled to the control unit for transmitting the scenic spot release index to a server according to the control of the control unit. If another navigating device accesses the scenic spot release index through the server and requests to download the scenic spot information according to the scenic spot release index, then the control unit will retrieve the scenic spot information from the storage unit, and the communication unit will transmit at least one part of the scenic spot information to the other navigating device.

Wherein, the positioning message received by the positioning unit further comprises time information and the control unit generates the scenic spot release index according to the time information.

Wherein, the navigating device further comprises an input unit, and the control unit receives a category inputted from the input unit and generates the scenic spot release index according to the category.

Wherein, the identity identification message is an ID number or an address of the navigating device.

Wherein, the navigating device further comprises an input unit for inputting set search information, and the communication unit transmits the set search information to the server, and the server receives the scenic spot release index that matches the set search information.

Wherein, the storage unit further comprises map information, and the control unit marks a specific symbol at a position in the map information corresponding to the scenic spot release index according to the scenic spot release index received by the communication unit.

To achieve the foregoing objective, the present invention further provides a navigating device peer-to-peer scenic information sharing method applicable for a peer-to-peer scenic information sharing navigating device, and the peer-to-peer scenic information sharing navigating device comprises an information capturing unit, a positioning unit, a control unit, a storage unit and a communication unit, and the method comprises the steps of: receiving a positioning message through the positioning unit to determine position information of a point of interest; obtaining scenic spot information of the point of interest through the information capturing unit; using the control unit coupled to the information capturing unit and the positioning unit to receive the scenic spot information and the corresponding position information, and generate a scenic spot release index based on an identity identification message that represents the navigating device; controlling a storage unit by the control unit to store the scenic spot information; controlling the communication unit by the control unit to transmit the scenic spot release index to a server; controlling the storage unit to retrieve the scenic spot information by the control unit if another navigating device accesses the scenic spot release index through the server and requests to download the scenic spot information according to the scenic spot release index; and transmitting at least one part of the scenic spot information to the other navigating device by the communication unit.

Wherein, the positioning message received by the positioning unit further comprises time information, and the method further comprises the step of generating the scenic spot release index according to the time information by the control unit.

Wherein, the navigating device peer-to-peer scenic information sharing method further comprises the step of using the control unit to receive the scenic spot information and the corresponding time information.

Wherein, the navigating device further comprises an input unit, and the navigating device peer-to-peer scenic information sharing method further comprises the steps: receiving a category inputted from the input unit by the control unit; and generating the scenic spot release index according to the category by the control unit.

Wherein, the identity identification message is an ID number or an address of the navigating device.

Wherein, the peer-to-peer scenic information sharing navigating device further comprises an input unit for inputting set search information, and the method comprises the steps of: using the communication unit to transmit the set search information to the server; and receiving the scenic spot release index corresponding to the set search information transmitted from the server through the communication unit.

Wherein, the storage unit further comprises map information, and the method further comprises the step of marking a specific symbol at a position in the map information corresponding to the scenic spot release index.

In summation, the peer-to-peer scenic spot information sharing navigating device and method of the present invention have the following advantages:

(1) The peer-to-peer scenic spot information sharing navigating device and method allow users to transmit information peer to peer between navigating devices to save time and obtain the most updated information conveniently and accurately.

(2) The peer-to-peer scenic spot information sharing navigating device and method allow users to transmit information peer to peer between navigating devices to provide a broad information transmission and a quick download.

(3) The peer-to-peer scenic spot information sharing navigating device and method allow navigating devices to provide diversified commercial, recreational or traffic services.

(4) The peer-to-peer scenic spot information sharing navigating device and method provide an unlimited expansion function to the map information of the navigating device without being limited by the business operators.

The aforementioned and other objectives, technical characteristics and advantages of the present invention will become apparent with the detailed description of preferred embodiments and the illustration of related drawings as follows.

DETAILED DESCRIPTION OF THE PREFERRED EMBODIMENTS

The technical contents and characteristics of the present invention will be apparent with the detailed description of a preferred embodiment accompanied with related drawings as follows. For simplicity, the same numerals are used for the same respective elements in the description of the following preferred embodiments and the illustration of the drawings.

Figure 1:
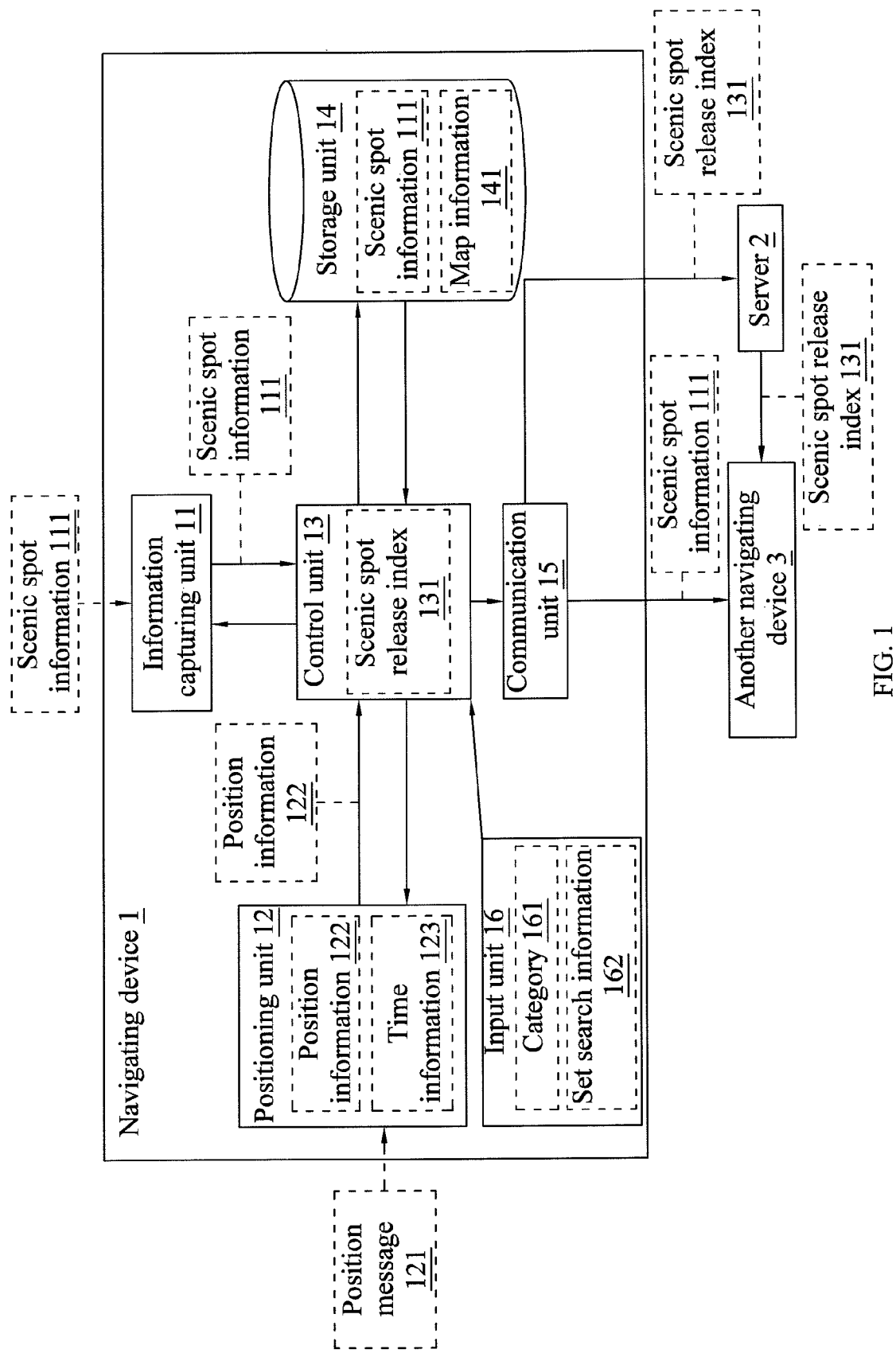
FIG. 1 is a block diagram of a peer-to-peer scenic information sharing navigating device of the present invention.

With reference to FIG. 1 for a block diagram of a peer-to-peer scenic information sharing navigating device of the present invention, the navigating device 1 comprises an information capturing unit 11, a positioning unit 12, a control unit 13, a storage unit 14, a communication unit 15 and an input unit 16. The information capturing unit 11 can be a camera, a video camera, a keyboard or a mouse used for accessing scenic spot information 111 of a point of interest (POI) positioned by the positioning unit 12. The positioning unit 12 determines position information 122 and time information 123 of a point of interest according to a positioning message 12 received by a global positioning system (GPS). The control unit 13 can be a central processing unit (CPU) or a micro-processing unit coupled to the information capturing unit 11 and the positioning unit 12 for receiving the scenic spot information 111 and the corresponding position information 122, and generating a scenic spot release index 131 based on an identity identification message that represents the navigating device 1, wherein the identity identification message of the navigating device 1 can be a code, an ID number or an Internet protocol (IP) address IP of the navigating device 1. The input unit 16 can be a keyboard, a mouse, a voice recognition input device or a touch panel, and a user can input a category 161 of the scenic spot information 111 to the navigating device 1, and the control unit 13 generates a scenic spot release index 131 based on the category 161 inputted by the user. The storage unit 14 is coupled to control unit 13 and provided for storing map information 141, and storing the scenic spot information 111 according to a control of the control unit 13. The communication unit 15 is coupled to control unit 13 and provided for transmitting the scenic spot release index 131 to the server 2 according to a control of the control unit 13. On the other hand, the server 2 receives and stores the scenic spot release index 131.

Further, the user can input set search information 162 such as a keyword, a shopping discount, an exhibition activity, a road scene or a traffic condition from the input unit 16, or can set a range for searching the map information 141 such as searching a location within a distance of 500 meters from a building, or can specify a certain administrative region as the search scope. A user of another navigating device 3 can input set search information from an input unit and use a communication unit to transmit the set search information to the server 2. On the other hand, the server 2 receives the set search information transmitted from the other navigating device 3 and transmits a scenic spot release index 131 corresponding to the set search information to the other navigating device 3. After the communication unit of the other navigating device 3 receives the scenic spot release index 131 fed back from the server 2, the control unit marks a specific symbol corresponding to the scenic spot release index 131 in the map information, and each specific symbol represents a valid release node. Therefore, the user can select one of the symbols to request downloading the scenic spot information 111.

In the description above, if the other navigating device 3 request the navigating device 1 to download according to the scenic spot release index 131, then the control unit 13 of the navigating device 1 will retrieve the scenic spot information 111 from the storage unit 14, and the communication unit 15 will transmit at least one part of the scenic spot information 111 to the other navigating device 3. Therefore, the navigating device 1 and the other navigating device 3 can transmit scenic spot information 111 peer to peer.

In general, the user can use the navigating device 1 to select the desired scenic spot information 111 according to the scenic spot release index 131. A navigating device providing a shopping service platform is used as an example, wherein a user can receive a discount promotion activity, a new opening shop or a new product released by another navigating device, and the user can communicate with a user of the other navigation device through the navigating device 1, and the user can select a product from the navigating device 1 and select a designated place for the goods delivery or a positioning location of the navigating device 1. Further, a navigating device providing a road service platform is used as an example, wherein a user can check a map of roads or building floor plans through the scenic spot information 111 released by the other navigating device, and the navigating device 1 can store the user's required road information into the storage unit 14 and integrate the corresponding road information into map information 141. Further, a navigating device providing a traffic service platform is also used as an example, wherein a user can use a navigating device 1 to monitor traffic conditions instantly, review history records, or label special situations such as a poor weather, a road jam, a traffic accident, or a road construction by different colors or symbols and integrate these information into the map information 141.

It is noteworthy to point out that the peer-to-peer information transmitting navigating device of the present invention is characterized in that a part of the scenic spot information can be downloaded peer to peer between navigating devices. In the meantime, the navigating device becomes a new seed and provides scenic spot information for download by other navigating devices, so as to improve the download speed between the navigating devices.

Figure 2:
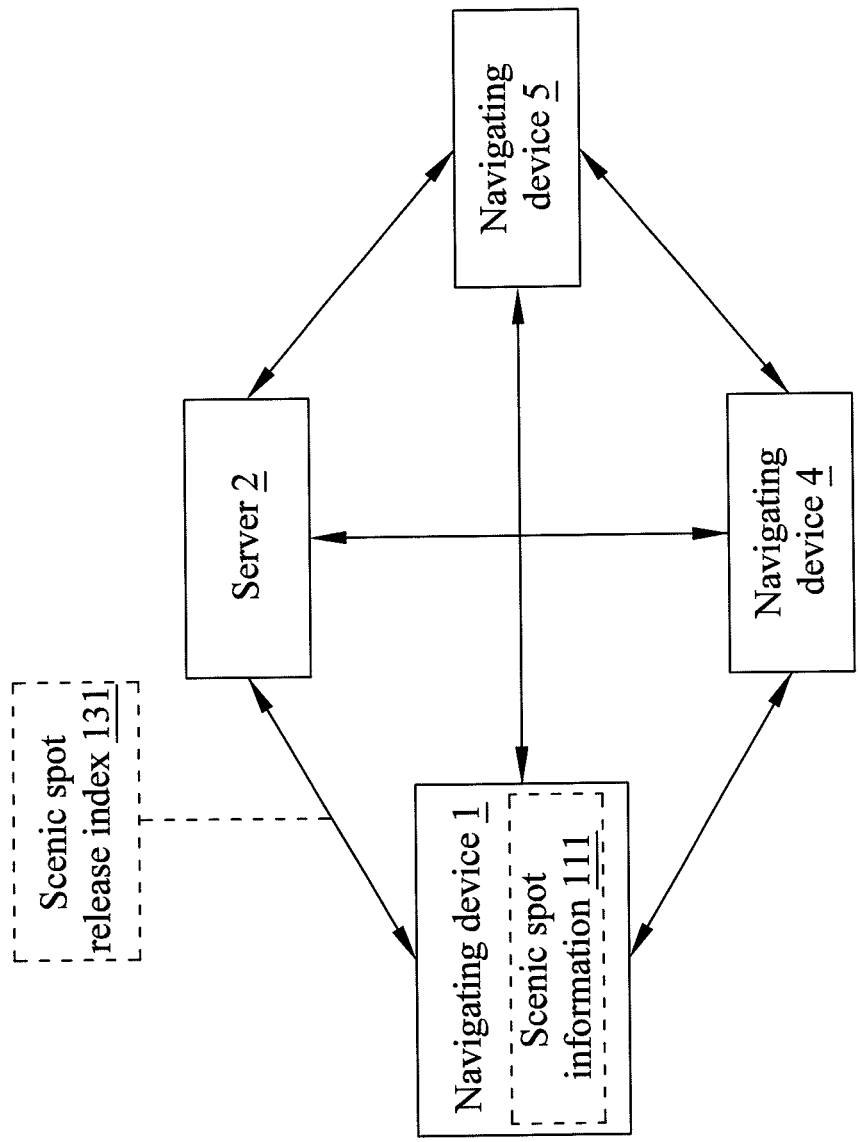
FIG. 2 is a schematic view of a peer-to-peer scenic information sharing navigating device in accordance with a first preferred embodiment of the present invention.

With reference to FIG. 2 for a schematic view of peer-to-peer scenic information sharing navigating device in accordance with the first preferred embodiment of the present invention, the navigating device 1 retrieves the scenic spot information 111 and releases a scenic spot release index 131 to the server 2. And then, the navigating device 4 receives a scenic spot release index 131 transmitted from the server 2, so that the user can know that the navigating device 1 has the scenic spot information 111 and can request from navigating device 1 to download the scenic spot information 111. In the meantime, the navigating device 4 becomes a download seed of the scenic spot information 111, and the navigating device 4 can upload a part of the scenic spot information 111 for sharing. In other words, of the navigating device 5 receives the scenic spot release index 131 transmitted from the server 2, so that the user can know that the navigating device 1 and the navigating device 4 have the scenic spot information 111 and request downloading the scenic spot information 111, and the navigating device 5 can download a part of the scenic spot information 111 from the navigating device 1 and the navigating device 4. In the meantime, the navigating device 5 becomes a download seed of the scenic spot information 111, and users can upload and share the scenic spot information 111 provided for the download by other navigating devices.

Figure 3:
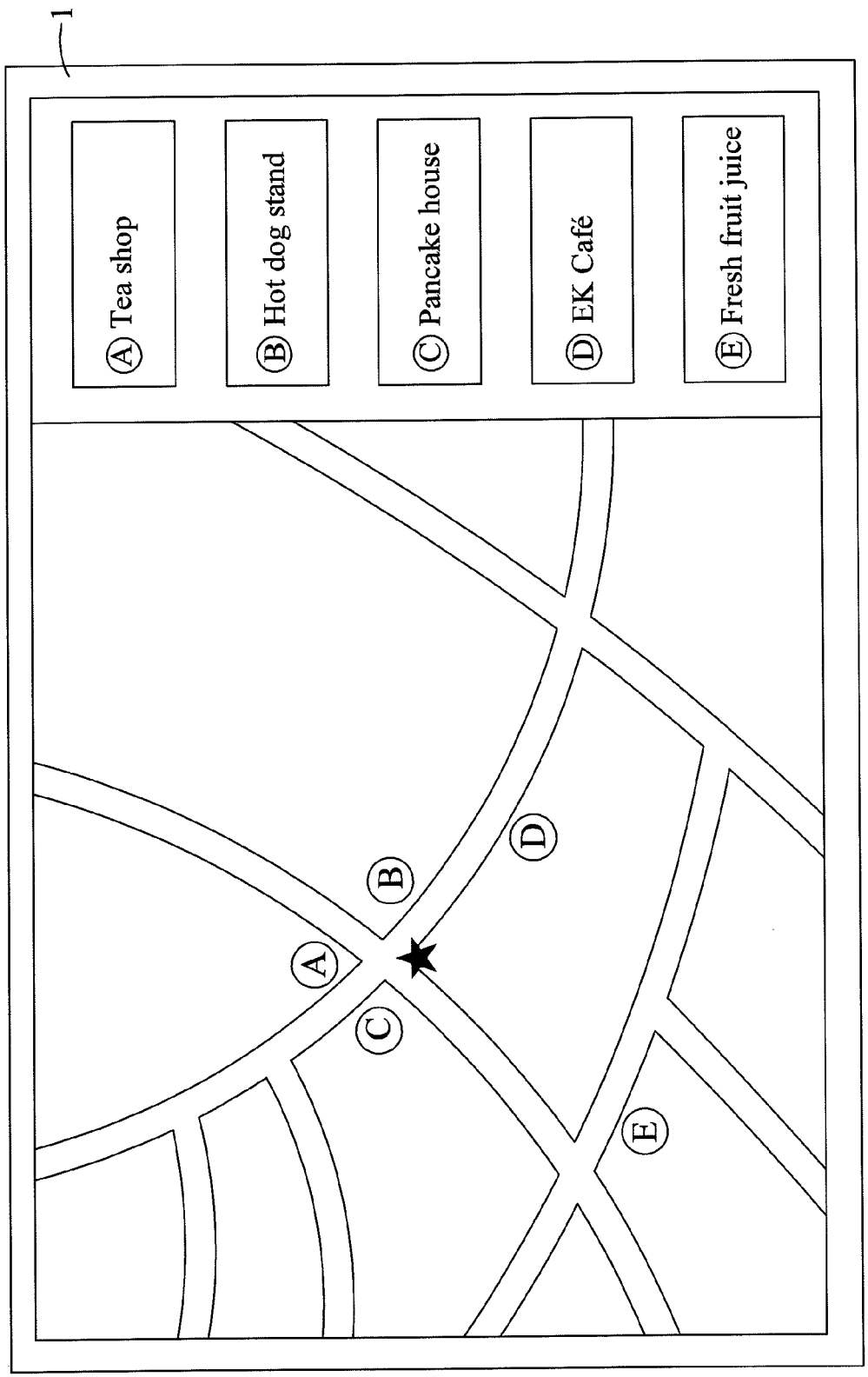
FIG. 3 is a schematic view of a peer-to-peer scenic information sharing navigating device in accordance with a second preferred embodiment of the present invention.

With reference to FIG. 3 for a schematic view of a peer-to-peer scenic information sharing navigating device in accordance with the second preferred embodiment of the present invention, a user can use a navigating device 1 to set the information of searching to a "dining" type and use feedback information of the server to know that five locations A, B, C, D and E can meet the user's required scenic spot release index. Therefore, the user can select and download the scenic spot information of the location A, B, C, D or E according to personal preference.

While the invention has been described by means of specific embodiments, numerous modifications and variations could be made thereto by those skilled in the art without departing from the scope and spirit of the invention set forth in the claims.

Figure 4:
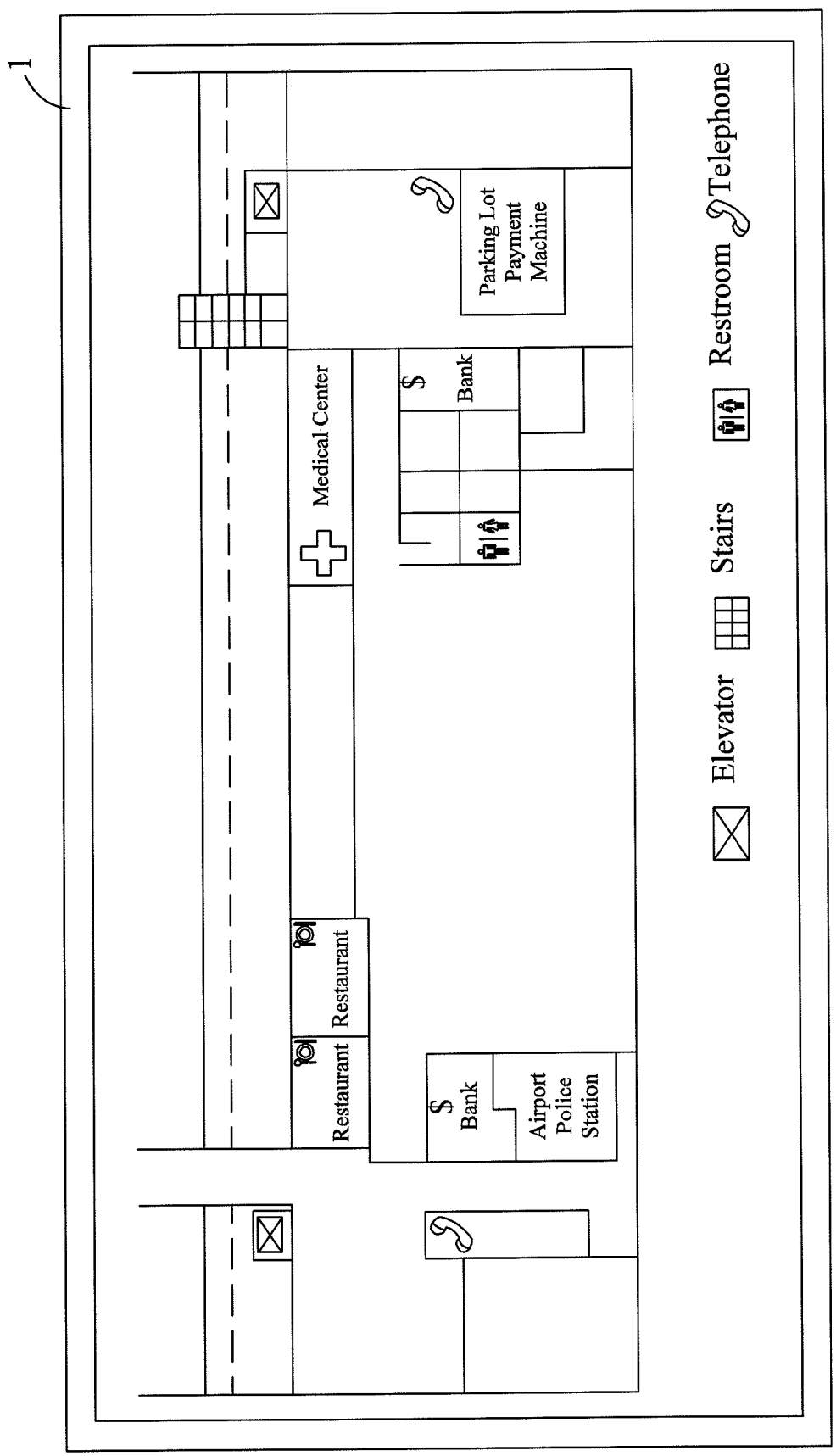
FIG. 4 is a schematic view of a peer-to-peer scenic information sharing navigating device in accordance with a third preferred embodiment of the present invention.

Further, the user can look up or download the map of roads or building floor plans through the road service platform provided by the navigating device 1. With reference to FIG. 4 for a schematic view of a peer-to-peer scenic information sharing navigating device in accordance with the third preferred embodiment of the present invention, if a user lose direction in an airport, the user can set the navigating device 1 to search "airport" and use the feedback information of the server 2. Further, the user can obtain the map of the airport fed back from the server 2 according to the user's requirements.

Figure 5:
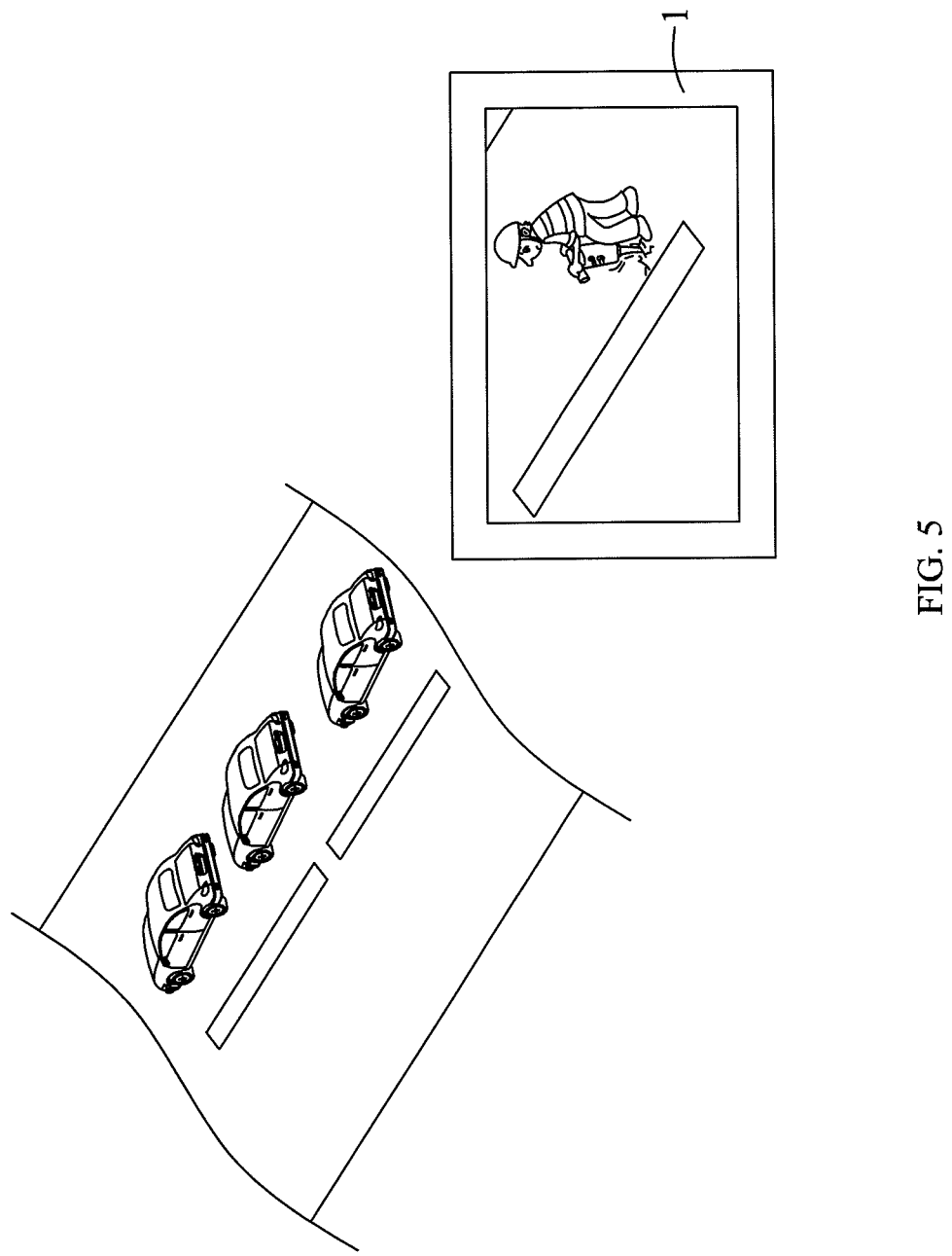
FIG. 5 is a schematic view of a peer-to-peer scenic information sharing navigating device in accordance with a fourth preferred embodiment of the present invention.

With reference to FIG. 5 for a schematic view of a peer-to-peer scenic information sharing navigating device in accordance with the fourth preferred embodiment of the present invention, a traffic jam is used as an example. In FIG. 5, a driver is stuck in traffic jam, and the driver can know from navigating device 1 that a road construction is taking place in the front, and a section of the road is congested, so that the driver can select a detour to avoid the road construction site or traffic jam.

Even though the concept of the peer-to-peer scenic information sharing method of a navigating device the present invention has been described in the section of the navigating device of the present invention, the following flow chart is given to illustrate the method clearly.

Figure 6:
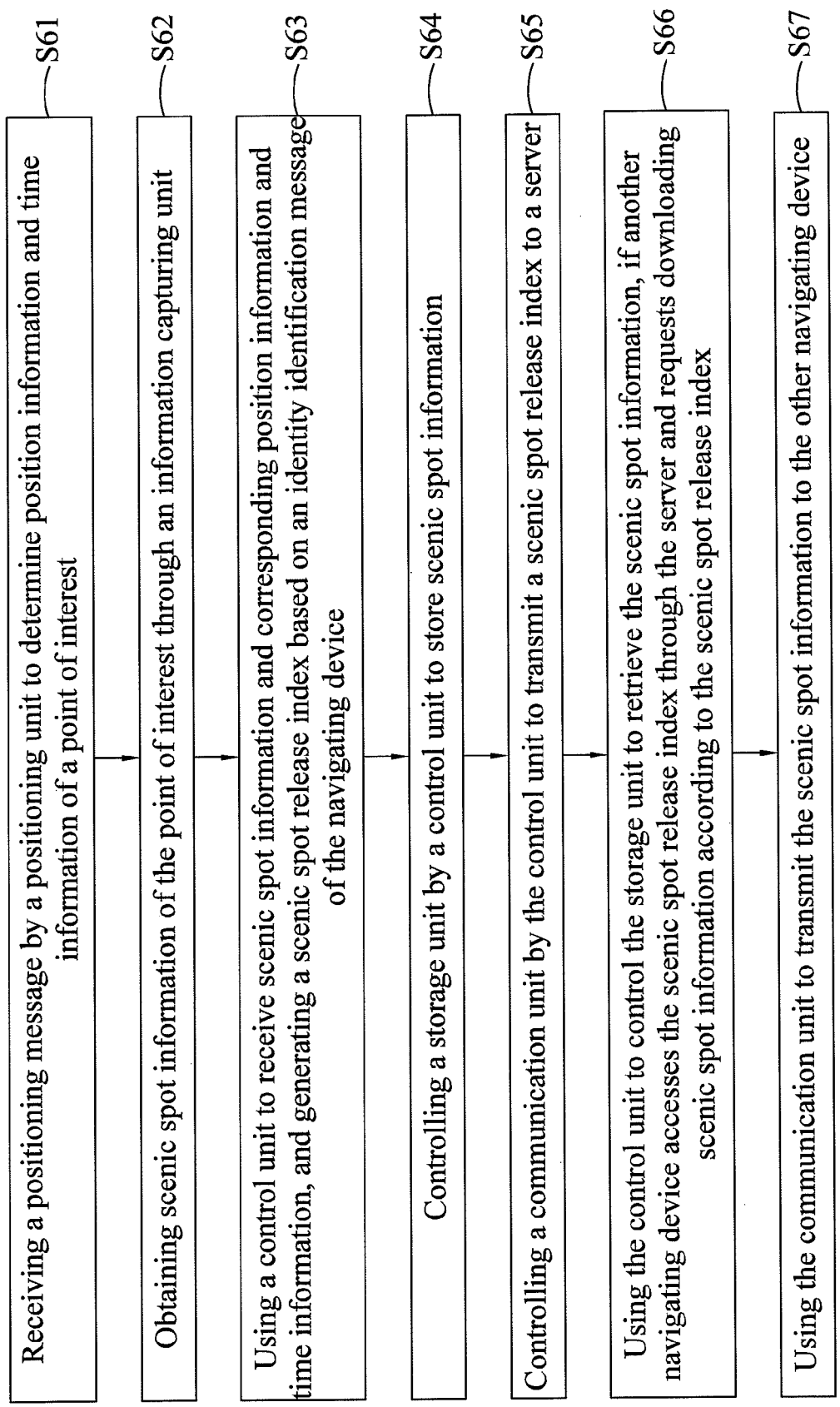
FIG. 6 is a first flow chart of a navigating device peer-to-peer scenic information sharing method of the present invention.

With reference to FIG. 6 for the first flow chart of the navigating device peer-to-peer scenic information sharing method of the present invention, the method is applicable for a peer-to-peer scenic information sharing navigating device. The peer-to-peer scenic information sharing navigating device comprises an information capturing unit, a positioning unit, a control unit, a storage unit and a communication unit. The navigating device peer-to-peer scenic information sharing method comprises the following steps:

S61: Receiving a positioning message by a positioning unit to determine position information and time information of a point of interest.

S62: Obtaining scenic spot information of the point of interest through an information capturing unit, wherein, the information capturing unit can be a camera, a video camera, a keyboard or a mouse for obtaining scenic spot information of the point of interest positioned by a positioning unit.

S63: Using a control unit to receive scenic spot information and corresponding position information and time information, and generate a scenic spot release index based on an identity identification message of the navigating device. Wherein the identity identification message is a node which can be a code, an ID number or an internet protocol (IP) address of the navigating device.

S64: Controlling a storage unit by a control unit to store scenic spot information.

S65: Controlling a communication unit by the control unit to transmit a scenic spot release index to a server.

S66: Using the control unit to control the storage unit to retrieve the scenic spot information, if another navigating device accesses the scenic spot release index through the server and requests downloading scenic spot information according to the scenic spot release index.

S67: Using the communication unit to transmit the scenic spot information to the other navigating device.

It is noteworthy to point out that the step S65 further comprises the following steps. Firstly. The control unit receives a category inputted from the input unit. And then, the control unit generates the scenic spot release index according to the category.

Figure 7:
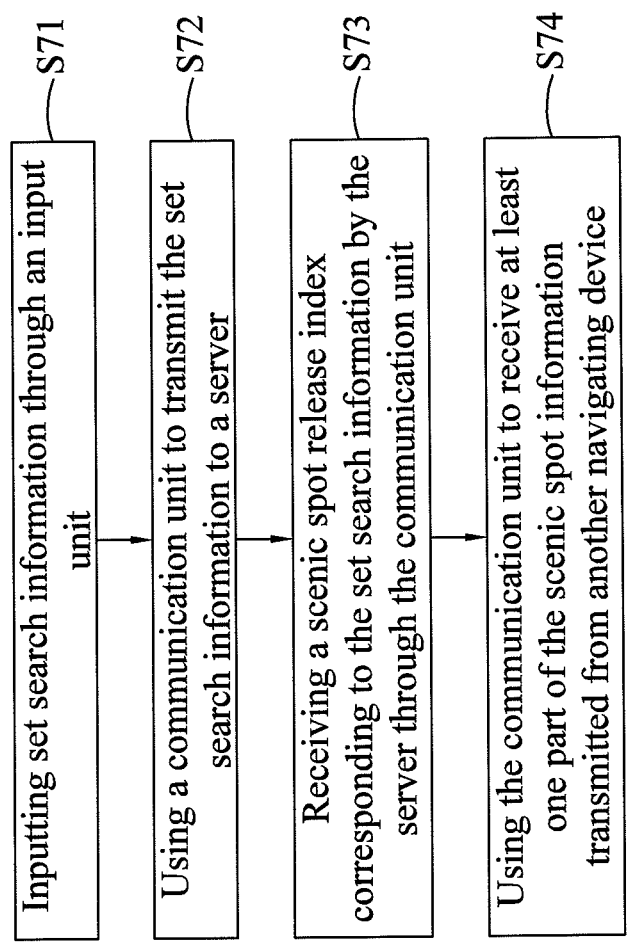
FIG. 7 is a second flow chart of a navigating device peer-to-peer scenic information sharing method of the present invention.

On the other hand, the user can search desired scenic spot information from the navigating device. With reference to FIG. 7 for the second flow chart of the navigating device peer-to-peer scenic information sharing method of the present invention, the peer-to-peer scenic information sharing navigating device comprises an information capturing unit, a positioning unit, a control unit, a storage unit, a communication unit and an input unit, and the navigating device peer-to-peer scenic information sharing method comprises the following steps:

S71: Inputting set search information through an input unit.

S72: Using a communication unit to transmit the set search information to a server.

S73: Receiving a scenic spot release index corresponding to the set search information by the server through the communication unit.

S74: Using the communication unit to receive at least one part of the scenic spot information transmitted from another navigating device.

It is noteworthy to point out that the step S73 further comprises the step of marking a specific symbol at a position in the map information corresponding to the scenic spot release index through the control unit.

The detailed description and implementation of the navigating device peer-to-peer scenic information sharing method of the present invention have been described in the previous section of the peer-to-peer scenic information sharing navigating device of the present invention already, and thus will not be repeated.

In summation of the description above, the peer-to-peer scenic information sharing navigating device and method of the present invention can save time and provide the most updated accurate scenic spot information conveniently to users, and allows navigating devices to share peer-to-peer scenic information, so as to lower the cost of servers, and allow related manufacturers to develop diversified commercial, recreational or traffic services.

What is claimed is:

1. A peer-to-peer scenic information sharing navigating device, comprising:
a locator including a first terminal, the locator being provided to receive a positioning message, and to determine position information of a point of interest;
an information capturing unit including a second terminal, the information capturing unit being provided to obtain scenic spot information of the point of interest;
a controller, coupled to the information capturing unit and the locator, and the controller including a third terminal, a fourth terminal, and a fifth terminal, and receiving the scenic spot information and the corresponding position information respectively via the third terminal and the fourth terminal, and generating a scenic spot release index based on an identity identification message that represents the navigating device, the positioning message is received by the locator according to a control of the controller via the first terminal, and the scenic spot information of the point of interest is obtained by the information capturing unit according to a control of the controller via the second terminal;
a storage with a sixth terminal, coupling to the controller, the storage receiving the scenic spot information via the sixth terminal and storing the scenic spot information according to a control of the controller; and
a data transmitter with a seventh terminal, coupling to the controller, and transmitting the scenic spot release index to a server according to a control of the controller via the seventh terminal;
wherein, if another navigating device accesses the scenic spot release index through the server and requests to download the scenic spot information according to the scenic spot release index, the controller retrieves the scenic spot information from the storage via the fifth terminal, and the data transmitter transmits at least one part of the scenic spot information to the another navigating device.

2. The peer-to-peer scenic information sharing navigating device of claim 1, wherein the positioning message received by the locator further comprises time information and the controller generates the scenic spot release index according to the time information.

3. The peer-to-peer scenic information sharing navigating device of claim 1, further comprising an input unit coupled to the controller, and the controller further including an eighth terminal, and the controller receiving a category inputted from the input unit via the eighth terminal, and generating the scenic spot release index according to the category.

4. The peer-to-peer scenic information sharing navigating device of claim 1, wherein the identity identification message is an ID number or an address of the navigating device.

5. The peer-to-peer scenic information sharing navigating device of claim 1, further comprising an input unit coupled to the controller, and the controller further including an eighth terminal, and the input unit inputting set search information to the controller via the eighth terminal, and the data transmitter transmitting the set search information to the server, and the server receiving the scenic spot release index that matches the set search information.

6. The peer-to-peer scenic information sharing navigating device of claim 5, wherein the storage further comprises map information, and the controller marks a specific symbol at a position in the map information corresponding to the scenic spot release index according to the scenic spot release index received by the data transmitter via the seventh terminal.

7. A navigating device peer-to-peer scenic information sharing method, applicable for a peer-to-peer scenic information sharing navigating device, and the peer-to-peer scenic information sharing navigating device comprising an information capturing unit, a positioning unit, a control unit, a storage unit and a communication unit, and the method comprising the steps of:
receiving a positioning message through the positioning unit to determine position information of a point of interest;
obtaining scenic spot information of the point of interest through the information capturing unit;
using the control unit coupled to the information capturing unit and the positioning unit to receive the scenic spot information and the corresponding position information, and generate a scenic spot release index based on an identity identification message that represents the navigating device;
controlling the storage unit by the control unit to store the scenic spot information;

controlling the communication unit by the control unit to transmit the scenic spot release index to a server;

controlling the storage unit to retrieve the scenic spot information by the control unit if another navigating device accesses the scenic spot release index through the server and requests downloading the scenic spot information according to the scenic spot release index; and transmitting at least one part of the scenic spot information to the another navigating device by the communication unit.

8. The navigating device peer-to-peer scenic information sharing method of claim 7, wherein the positioning message received by the positioning unit further comprises time information, and the method further comprises the step of generating the scenic spot release index according to the time information by the control unit.

9. The navigating device peer-to-peer scenic information sharing method of claim 7, wherein the navigating device further comprises an input unit, and the method further comprises the steps:

receiving a category inputted from the input unit by the control unit; and generating the scenic spot release index according to the category by the control unit.

10. The navigating device peer-to-peer scenic information sharing method of claim 7, wherein the identity identification message is an ID number or an address of the navigating device.

11. The navigating device peer-to-peer scenic information sharing method of claim 7, wherein the peer-to-peer scenic information sharing navigating device further comprises an input unit for inputting set search information, and the method comprises the steps of:

using the communication unit to transmit the set search information to the server; and receiving the scenic spot release index corresponding to the set search information transmitted from the server through the communication unit.

12. The navigating device peer-to-peer scenic information sharing method of claim 11, wherein the storage unit further comprises map information, and the method further comprises the step of marking a specific symbol at a position in the map information corresponding to the scenic spot release index.

* * * * *